United States Patent
Wada et al.

[15] 3,685,726
[45] Aug. 22, 1972

[54] PROCESSOR CONTROL COMPUTER

[72] Inventors: Koji Wada, Takatsuki; Akira Ishida, Kyoto, both of Japan

[73] Assignee: Kabushiki-Kaisha Shashin Kagaku Kamigyo-ku, Kyoto, Japan

[22] Filed: May 12, 1970

[21] Appl. No.: 36,657

[30] Foreign Application Priority Data

May 14, 1969 Japan .....................44/43663

[52] U.S. Cl..............................................235/64.7
[51] Int. Cl. ................................................G06c 3/00
[58] Field of Search ...............235/64.7, 88, 78, 61 B

[56] References Cited

UNITED STATES PATENTS

| | | | |
|---|---|---|---|
| 2,235,590 | 3/1941 | Rockwell, Jr. | 235/64.7 X |
| 2,380,244 | 7/1945 | Jones et al. | 235/64.7 X |
| 3,047,221 | 7/1962 | Alfaya et al. | 235/64.7 |
| 3,117,722 | 1/1964 | Bugelholl | 235/64.7 |

Primary Examiner—Richard B. Wilkinson
Assistant Examiner—Stanley A. Wal
Attorney—Stanley D. Schwartz

[57] ABSTRACT

A processor control computer used to control the development of lith type films with respect to its quality, rate of development, contrast, etc. The processor control computer comprises a first scale member and a second scale member capable of relative movement. A first graduated scale is on the first scale member and contains the numerical values corresponding to a control strip for development. The second scale member contains a graduated scale equal to the graduations of the first scale and an index means providing for the calculation of the difference between the values of the first and second scales. A third graduated scale on the second scale member is adapted to be indicated by the inex means and represents the control gradient of a given photosensitive material. A fourth graduated scale along either the first or second scale represents the effective speed of a given developer.

5 Claims, 3 Drawing Figures

PROCESSOR CONTROL COMPUTER

In order to maintain the quality, developing rate (i.e., the speed at which the development proceeds), contrast, etc. of a film being developed constant, a fresh developer is supplied to the developing bath under precise control. To carry out this control successfully, it is important to know the activity and balance of the developing solution beforehand. Especially when the process is performed using an automatic developing machine, the operator should have an exact knowledge of the condition of the solution at all times.

The activity and balance of a given developing solution can be determined during the development process by developing, at regular intervals, test films previously exposed for checking the results of their development by the solution. In the course of process work where high-contrast, high-gamma lith type films are used, a practice gaining wide acceptance in the art is to use a special film strip for test exposure, compare the numerical values on a scale marked beforehand on the test film with the photographic density attained by actual development, find a proper gradient from Table 1 as given later and, on the basis of the gradient value thus obtained, find a corresponding value in Table 2 as given later for the development speed, thus reading the activity and balance of the particular developing solution at the same time from these two tables.

As will be explained later, however, the two tables filled with so many small figures render it fairly cumbersome to find the numerical values corresponding to those obtained with the test film and, moreover, they tend to cause human errors in reading off the necessary values therefrom. Further, the calculating operation that one must perform in proceeding from Table 1 to Table 2 also involves the possibility of erroneous calculation. The reckoning of the activity and balance of a developer from the tables, therefore, is disadvantageous in that it is not quite easy, prompt, and accurate.

This invention aims at the provision of a computer of an extremely simplified construction for the development control of lith type films, which is free from the foregoing disadvantages and enables one to determine the activity and balance of a given developing solution easily, conveniently and in a practically automatic way.

According to the invention, there is provided a processer control computer for the calculation of the control gradient and the effective developer speed, in which a disc is mounted on a board in layers in such a manner that the disc can turn about its center pin secured to the board; in which the disc is graduated on the periphery thereof with a scale or the numerical values of the test film, the same scale being also graduated on the board along the circumference of the disc; in which the disc has an index for indicating the difference between the above two scales when the disc is turned relative to the board; in which the board has a second scale which is adapted to be indicated by the index for the representation of the control gradient; and in which the board has a third scale for the representation of the effective developer speed.

The present invention will be described in further detail hereunder with reference to the accompanying drawings, in which.

Figure 3:
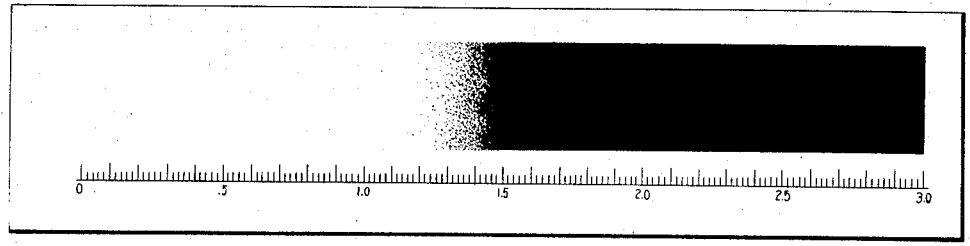
FIG. 3 is an example of the test film to be used with the computer of this invention.

Referring to FIG. 3 first, there is shown a film piece, hereinafter called "control strip," which is previously exposed and is adapted to be processed for development for test during process work. The control strip as developed shows that the portion where the density changes is approximately in the middle of the strip length. This transition point where the density changes is shifted leftward as viewed in FIG. 3 if the developing solution used is strong or active, and is shifted rightward if the solution is weak or is fatigued.

The control strip is graduated and marked beforehand with numerical scale values, hereinafter called "NSV" for brevity. After development, the strip is examined on a densitometer for the points corresponding to key density values of 0.3 and 3.5. Once the points in question have been found, the NSV's at points indicated on the densitometer are read out.

If it is assumed that, with a test strip as shown in FIG. 3, the NSV at the key density of 0.3 is 1.24 and the NSV at the key density of 3.5 is 1.56, then the difference between the two NSV's will be calculated to be 0.32. A numerical value corresponding to this numerical scale difference, hereinafter called "NSD," is found on Table 1 to be a gradient, hereinafter called "CG," of 10.0. This tabulation-based operation is rather troublesome because, as already described, the CG value is obtained only by carrying out the calculation to find the NSD and setting the value so obtained over the corresponding value in the table packed with small figures.

Figure 1:
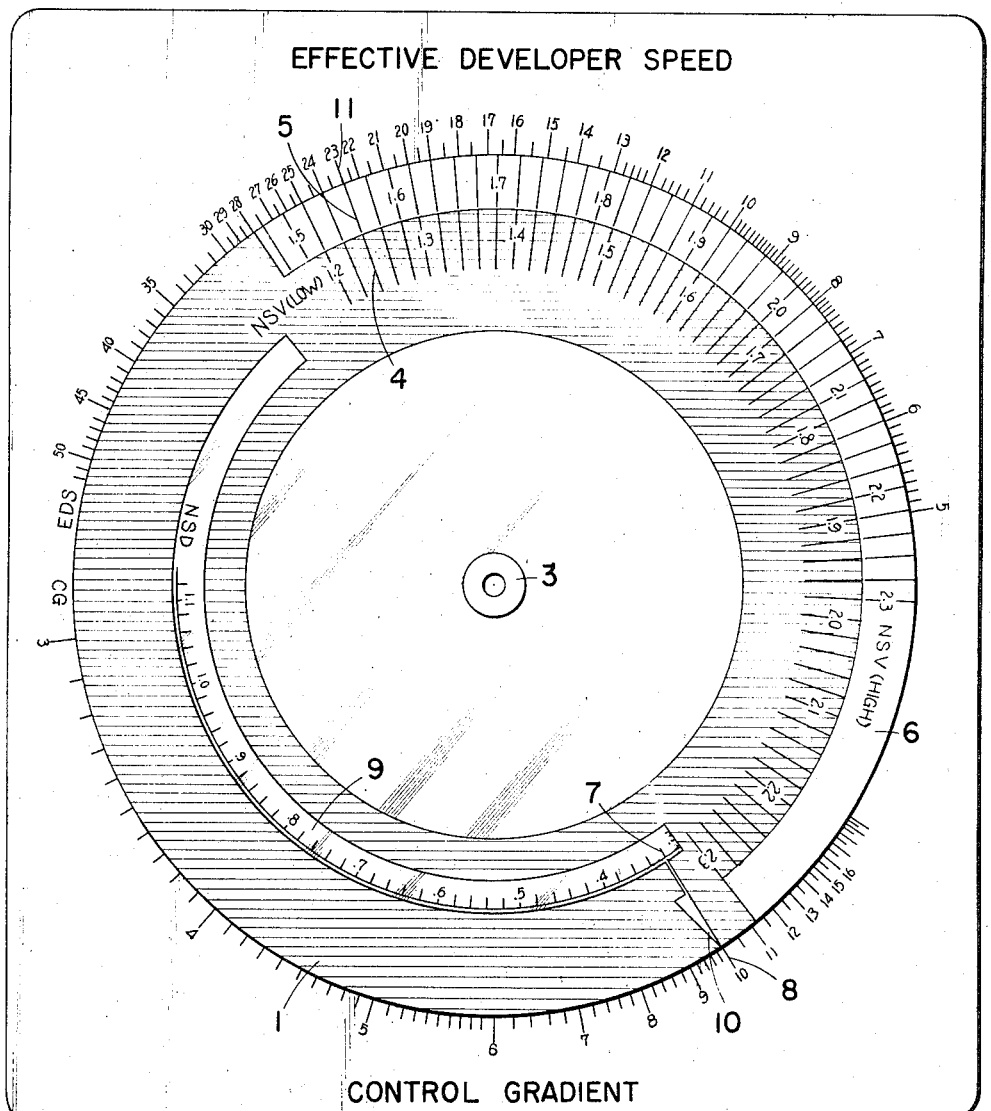
FIG. 1 is a top plan view of a computer embodying the invention.
Figure 2:
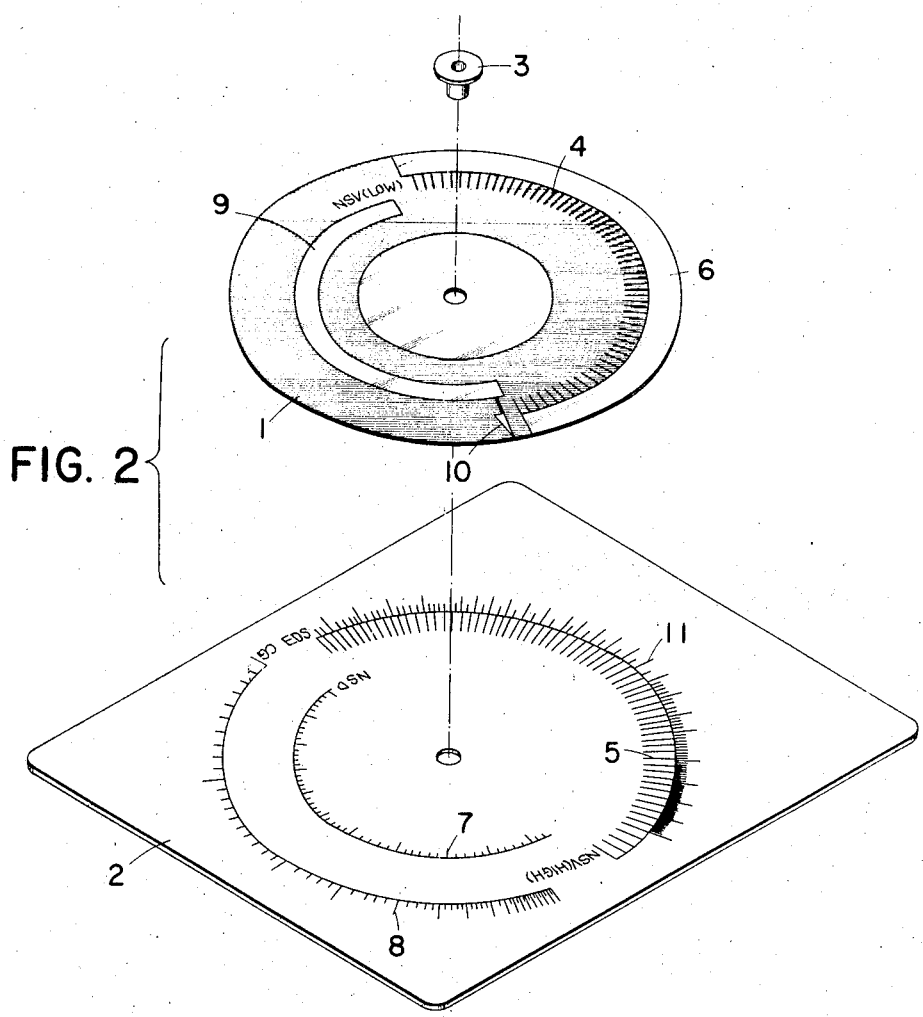
FIG. 2 is an exploded perspective view of the computer shown in FIG. 1.

According to this invention, therefore, Table 1 to be given later is incorporated in an arrangement as shown in FIG. 1, wherein a circular slide 1 is placed on and combined with a board 2 in such a manner that it can turn about a center pin 3 over the board 2, and the disc slide 1 is graduated on approximately a half of the periphery thereof with NSV's at 4, and the board 2 is equally graduated at 5 along a half of the circumference of the disc slide 1, in such a way that the NSV scale on the slide 1 reads from the lower side of the key density range and the NSV scale on the board 2 reads from the higher side of the key density range.

The slide 1 may be conveniently formed of a colored or opaque disc having a semi-circular transparent zone 6 along the one half of the periphery that carries the NSV scale, through which the NSV scale on the board 2 can be seen.

Since the difference between the NSV scales can be found by calculation beforehand, the difference NSD's can be given in a scale at 7 on the board 2, or at the opposite part beyond the center pin 3. Inasmuch as the difference between the higher key density, hereinafter called "high NSV," of 1.2 and the NSV at the lower key density, hereinafter called "low NSV" of 1.2 is zero, the high NSV of 1.2 and the low NSV of 1.2 when matched together set the difference between the two NSV's, or the NSD of zero, at a point along the periphery of the slide 1 opposite to the NSV-scaled periphery beyond the center pin 3. Similarly, the difference NSD of 0.1 between the high NSV of 1.3 and the low NSV of 1.2 is set at a corresponding point on the periphery of the slide 1. Thus, in the manner described, the difference NSD of 1.0 between the high NSV of 2.2 and the low NSV of 1.2 and the difference NSD of 1.1 between the high NSV of 2.3 and the low NSV of 1.2 are given on the corresponding scale.

Now that the position of the NSD's 0 to 1.1 have been set in the scale (though actually the range between 0 and 0.12 is not required), the numerical values of the gradient CG's corresponding to the NSD's, which are known from Table 1, can be graduated at 8 on the board 2 as matched with the individual NSD values ranging from 0 to 1.1.

While the slide 1 in the embodiment shown is formed with a semi-circular window or slot 9 through which the NSD scale on the board 2 can be seen, it should be noted that the NSD scale here is provided merely by way of reference.

Since it is only necessary, after all, to provide an indicator to set the difference between any pair of values on the two NSV scales over the board, the slide 1 is marked with an arrow 10 as an indicator, so that a given CG value as indicated by the arrow can be read off the scale 8.

The strength or efficiency of a developing solution, hereinafter called "EDS," corresponds to and is dictated by the NSV on the higher side, which is known from Table 2 that is given later. Accordingly, the EDS scale can be provided on the board 2 at 11 along the NSV scale 5 thereon.

By way of exemplification, it is assumed now that the position of the key density values of 0.3 and 3.5 of the control strip shown in FIG. 3 have been found with a densitometer to be at the high NSV value of 1.56 and the low NSV value of 1.24, respectively. Here the position of 1.24 on the NSV scale 4 of the slide 1 is set over the position of 1.56 on the NSV scale 5 of the board 2 (as shown in FIG. 1). Then, the CG value of 10.0 that corresponds to the NSD of 0.32 is indicated on the CG scale 8 of the board 2 by the arrow 10 of the slide 1. This means that the reckoning from Table 1 as in the usual practice is supplanted by mere turning of the slide 1 over the board 2.

On the other hand, the EDS being sought in this case is indicated as 22.8 on the EDS scale 11 marked outwardly of the NSV scale 5 of the board 2.

As described hereinabove, it is possible with the computer according to this invention to find the CG and EDS values of a particular developing solution simply by setting the NSV values of the control strip over the corresponding values on this computer or, without the inconvenience of reading out those values from the table of so many small figures. It is further possible to omit the calculating operation usually required before proceeding from Table 1 to Table 2 and eliminate the possibility of any erroneous calculation due to misreading of the tables.

Though the invention has been described in some detail with reference to the single embodiment disclosed herein, it should be understood that variations thereto may be accomplished. For example, the position of the scale 8 is not limited to the place opposite to the scales 4 and 5 with respect to the center pin 3. The scales 4, 5, 8 and 11 may be all graduated side by side on four circles concentric to the pin 3, graduating each scale on the whole circumference of the respective circle. This arrangement of graduations has an advantage to widen the division of the respective scale and to improve distinctness in reading.

TABLE 1 (Control gradient)

| NSD | CG | NSD | CG | NSD | CG |
|---|---|---|---|---|---|
| 1.06 | 3.0 | 0.70 | 4.6 | 0.44 | 7.3 |
| 1.03 | 3.1 | 0.69 | 4.6 | 0.43 | 7.4 |
| 1.00 | 3.2 | 0.68 | 4.7 | 0.42 | 7.6 |
| 0.96 | 3.3 | 0.67 | 4.8 | 0.41 | 7.8 |
| 0.94 | 3.4 | 0.66 | 4.8 | 0.40 | 8.0 |
| 0.91 | 3.5 | 0.65 | 4.9 | 0.39 | 8.2 |
| 0.90 | 3.6 | 0.64 | 5.0 | 0.38 | 8.4 |
| 0.89 | 3.6 | 0.63 | 5.1 | 0.37 | 8.7 |
| 0.88 | 3.6 | 0.62 | 5.1 | 0.36 | 8.9 |
| 0.87 | 3.7 | 0.61 | 5.2 | 0.35 | 9.1 |
| 0.86 | 3.7 | 0.60 | 5.3 | 0.34 | 9.4 |
| 0.85 | 3.8 | 0.59 | 5.4 | 0.33 | 9.7 |
| 0.84 | 3.8 | 0.58 | 5.5 | 0.32 | 10.0 |
| 0.83 | 3.9 | 0.57 | 5.6 | 0.31 | 10.3 |
| 0.82 | 3.9 | 0.56 | 5.7 | 0.30 | 10.7 |
| 0.81 | 4.0 | 0.55 | 5.8 | 0.29 | 11.0 |
| 0.80 | 4.0 | 0.54 | 5.9 | 0.28 | 11.4 |
| 0.79 | 4.1 | 0.53 | 6.0 | 0.27 | 11.9 |
| 0.78 | 4.1 | 0.52 | 6.2 | 0.26 | 12.3 |
| 0.77 | 4.2 | 0.51 | 6.3 | 0.25 | 12.8 |
| 0.76 | 4.2 | 0.50 | 6.4 | 0.24 | 13.3 |
| 0.75 | 4.3 | 0.49 | 6.5 | 0.23 | 13.9 |
| 0.74 | 4.3 | 0.48 | 6.7 | 0.22 | 14.5 |
| 0.73 | 4.4 | 0.47 | 6.8 | 0.21 | 15.2 |
| 0.72 | 4.4 | 0.46 | 7.0 | 0.20 | 16.0 |
| 0.71 | 4.5 | 0.45 | 7.1 | 0.19 | 16.9 |

TABLE 2 (Effective developer speed)

| NSV | EDS | NSV | EDS | NSV | EDS | NSV | EDS |
|---|---|---|---|---|---|---|---|
| 2.20 | 5.3 | 1.95 | 9.4 | 1.70 | 16.6 | 1.45 | 29.5 |
| 2.19 | 5.4 | 1.94 | 9.6 | 1.69 | 17.0 | 1.44 | 30.2 |
| 2.18 | 5.5 | 1.93 | 9.8 | 1.68 | 17.4 | 1.43 | 31.0 |
| 2.17 | 5.6 | 1.92 | 10.0 | 1.67 | 17.8 | 1.42 | 31.7 |
| 2.16 | 5.8 | 1.91 | 10.2 | 1.66 | 18.2 | 1.41 | 32.4 |
| 2.15 | 5.9 | 1.90 | 10.5 | 1.65 | 18.6 | 1.40 | 33.2 |
| 2.14 | 6.0 | 1.89 | 10.7 | 1.64 | 19.1 | 1.39 | 34.0 |
| 2.13 | 6.2 | 1.88 | 11.0 | 1.63 | 19.5 | 1.38 | 34.7 |
| 2.12 | 6.3 | 1.87 | 11.2 | 1.62 | 20.0 | 1.37 | 35.5 |
| 2.11 | 6.5 | 1.86 | 11.5 | 1.61 | 20.4 | 1.36 | 36.4 |
| 2.10 | 6.6 | 1.85 | 11.8 | 1.60 | 20.9 | 1.35 | 37.2 |
| 2.09 | 6.8 | 1.84 | 12.0 | 1.59 | 21.4 | 1.34 | 38.1 |
| 2.08 | 6.9 | 1.83 | 12.3 | 1.58 | 21.9 | 1.33 | 38.9 |
| 2.07 | 7.1 | 1.82 | 12.6 | 1.57 | 22.4 | 1.32 | 39.8 |
| 2.06 | 7.3 | 1.81 | 12.9 | 1.56 | 22.8 | 1.31 | 40.8 |
| 2.05 | 7.4 | 1.80 | 13.2 | 1.55 | 23.5 | 1.30 | 41.8 |
| 2.04 | 7.6 | 1.79 | 13.5 | 1.54 | 24.0 | 1.29 | 42.7 |
| 2.03 | 7.8 | 1.78 | 13.8 | 1.53 | 24.6 | 1.28 | 43.7 |
| 2.02 | 8.0 | 1.77 | 14.1 | 1.52 | 25.2 | 1.27 | 44.8 |
| 2.01 | 8.2 | 1.76 | 14.5 | 1.51 | 25.8 | 1.26 | 45.8 |
| 2.00 | 8.3 | 1.75 | 14.8 | 1.50 | 26.4 | 1.25 | 46.9 |
| 1.99 | 8.5 | 1.74 | 15.1 | 1.49 | 27.0 | 1.24 | 47.7 |
| 1.98 | 8.7 | 1.73 | 15.5 | 1.48 | 27.6 | 1.23 | 49.1 |
| 1.97 | 8.9 | 1.72 | 15.9 | 1.47 | 28.2 | 1.22 | 50.2 |
| 1.96 | 9.1 | 1.71 | 16.2 | 1.46 | 28.9 | 1.21 | 51.4 |
| | | | | | | 1.20 | 52.6 |

We claim:

1. A processor control computer comprising a first scale member and a second scale member; said first scale member being pivoted to said second scale member for relative rotation with respect thereto; a first scale on the periphery of said first scale member graduated with the numerical values of a control strip for development; a second scale on said second scale member having graduations thereon lying along the circumference of said first scale member equal to the graduations on said first scale member and graduated in the same manner as said first scale; index means in said first scale member; a numerical difference indicating scale on said second scale member positioned and graduated so that said index means will indicate the numerical scale value difference between the numerical values on said first scale member and said second scale member when the graduations on said first scale member are rotated to different positions of registry with the graduations on said second scale member; a third scale on said second scale member graduated so as to represent the control gradient for numerical scale value differences between the numerical scale values on said disc slide scale member and on said second scale member; a fourth scale on said second scale member adjacent to said second scale and graduated so as to indicate effective developer speeds that correspond with the various numerical scale values located on said second scale.

2. A computer according to claim 1, wherein the first scale member is a disc slide scale member.

3. A computer according to claim 2, wherein the third scale on the second scale member is graduated along the circumference of the disc.

4. A computer according to claim 1, wherein the index means is an arrow placed on the periphery of the first scale member.

5. A process control computer according to claim 1 wherein said disc slide scale member is placed on and combined with a stationary board in such a manner that the disc slide scale member can turn about a center pin over the stationary board, said disc slide scale being graduated on approximately one-half of the periphery thereof with said numerical values of said control strip for development; said stationary board being equally graduated along one-half of the circumference of said disc slide scale member; said index means being an arrow on the other half of said disc slide scale member opposite to said first half periphery across said center pin for indicating the numerical scale value difference between the above mentioned two scales when the disc slide scale member is turned relative to the board.

* * * * *